United States Patent
Dewey et al.

(10) Patent No.: US 10,218,059 B2
(45) Date of Patent: Feb. 26, 2019

(54) BEAM-STEERING ANTENNA DEFLECTOR

(71) Applicants: Chad E. Dewey, Omaha, NE (US); Harold R. Bledsoe, Brooks, GA (US)

(72) Inventors: Chad E. Dewey, Omaha, NE (US); Harold R. Bledsoe, Brooks, GA (US)

(73) Assignee: SMC Networks, Irvine, CA (US)

(*) Notice: Subject to any disclaimer, the term of this patent is extended or adjusted under 35 U.S.C. 154(b) by 87 days.

(21) Appl. No.: 15/363,977

(22) Filed: Nov. 29, 2016

(65) Prior Publication Data

US 2018/0151959 A1 May 31, 2018

(51) Int. Cl.
*H01Q 1/24* (2006.01)
*H01Q 1/22* (2006.01)
*H01Q 3/26* (2006.01)
*H01Q 19/10* (2006.01)
*H01Q 21/20* (2006.01)
*H04W 84/12* (2009.01)

(52) U.S. Cl.
CPC ........... *H01Q 1/246* (2013.01); *H01Q 1/2291* (2013.01); *H01Q 3/26* (2013.01); *H01Q 19/10* (2013.01); *H01Q 21/205* (2013.01); *H04W 84/12* (2013.01)

(58) Field of Classification Search
CPC ...................................................... H01Q 1/246
See application file for complete search history.

(56) References Cited

U.S. PATENT DOCUMENTS

| | | |
|---|---|---|
| 6,268,835 B1 | 7/2001 | Toland et al. |
| 7,474,254 B2 | 1/2009 | White et al. |
| 2015/0180120 A1* | 6/2015 | Pietraski ............ H01Q 15/0086 342/368 |

FOREIGN PATENT DOCUMENTS

WO   WO2015/142723   9/2015

* cited by examiner

*Primary Examiner* — Graham P Smith
(74) *Attorney, Agent, or Firm* — Mersenne Law (57) ABSTRACT

Radio transceivers comprising phased-array antennas and adjacent radio-reflective deflectors permit a scanning angle reachable by the phased-array antenna to be increased or multiplied to improve directed communications with peer transceivers located over a wider range (i.e., outside the scanning angle reachable by the phased-array alone). Embodiments may be used in wireless local area network ("WLAN") access points ("APs").

14 Claims, 7 Drawing Sheets

BEAM-STEERING ANTENNA DEFLECTOR

CONTINUITY AND CLAIM OF PRIORITY

This is an original U.S. patent application.

FIELD

The invention relates to steerable antennas for radio-frequency communication. More specifically, the invention relates to multi-element, phase-controlled antennas with passive deflectors to extend a range over which the antenna beam may be directed.

BACKGROUND

Radio waves—i.e., electromagnetic radiation—are widely used to communicate information from place to place. Information is modulated onto a radio-frequency carrier, which is emitted or radiated from one antenna and travels through intervening materials to reach a second antenna, where the signal is amplified and demodulated to recover the original information. (Some intervening materials may impede or prevent the propagation of radio waves, while others have little effect.)

Figure 2:
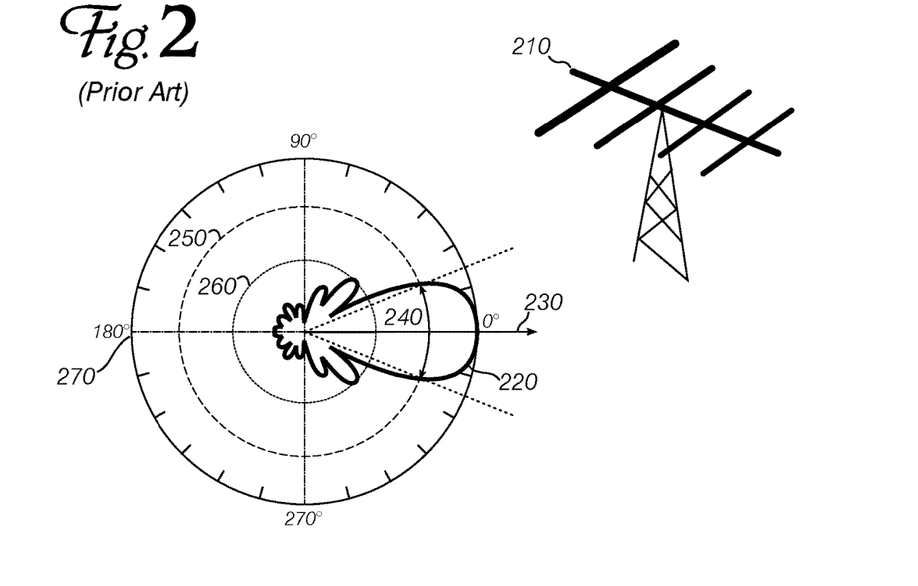
FIG. 2 shows a radiation pattern of a typical directional antenna.

Radio transmission power generally follows an inverse-square law, so that transmission over twice a given distance requires four times the power (or a receiver that is four times as sensitive). However, a directional antenna can improve this situation somewhat, by concentrating radiated power in one direction at the expense of other directions. (The same antennas are often used for transmission and reception, and are constructed so that improved directional radiation during transmission is accompanied by improved reception of signals arriving from the same direction.) Since increasing radio power is correlated with increasing design, manufacture and operational cost, directional antennas offer an economically favorable way to increase communication range for point-to-point and point-to-multipoint connections (as compared to ordinary broadcast operations). FIG. 2 represents the horizontal radiation pattern of a typical directional antenna ("Yagi" antenna 210). Heavy, multi-lobed pattern 220 indicates the power radiated on transmission (or the sensitivity during reception) at various points in a circle around the antenna. The pattern has a maximum of 100% or 0 dB in the principal direction (0°, reference character 230), and quickly falls off in either direction. The beam angle 240 may be set (by definition) where the power/sensitivity is 3 dB below the maximum (dashed circle 250); around most of the circle, the power/sensitivity may be reduced by 6 dB or more (260). The beam angle in this example is about 45° (22.5° in each direction). Opposite the principal direction (180°, reference character 270), very little power may be emitted, and signals arriving from that direction may not be detected. A similar shape can be plotted to show the radiation pattern when viewing the antenna from the side. The lobes (and particularly the principal lobe) are thus shaped somewhat like teardrops or spherical cones.

Figure 3:
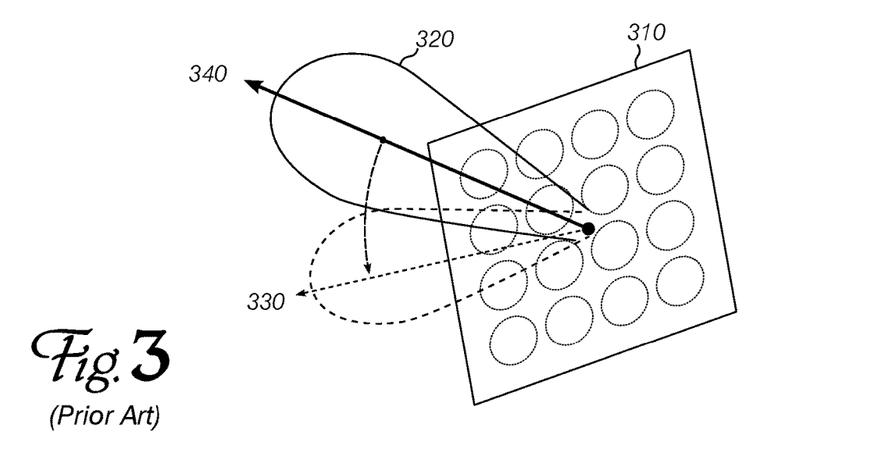
FIG. 3 shows example radiation patterns of a typical phased-array antenna.

At radio frequencies where phase control of the modulated signal is possible, multiple spaced-apart antennas can be operated together to achieve directional control of an anisotropic radiated beam. Phase differences between the signals at each antenna create an interference pattern that has a controllable shape and direction—a shape similar to the lobe pattern described above, whose principal axis can also be reoriented. The beam direction can be changed as quickly as a single carrier period—mere nanoseconds for a 2.5 GHz signal—and much faster than any physical antenna can be pointed. A line of phase-controlled antennas can sweep a wedge or halo of radio energy from perpendicular to the line, to one side or the other of the perpendicular direction. A two-dimensional array of phase-controlled antennas, such as the one depicted in FIG. 3 at 310 can form a conical beam of energy 320 and point it at directions skewed 330 from the normal to the array 340.

The width of the wedge, halo or beam is generally inversely proportional to the number of antennas in the line or array: more phase-controlled emitters can produce a narrower angle beam. The "width" of the beam is generally considered to be the angle to the side of the beam where the radiated power (or reception sensitivity to signals from that direction) has declined to a particular fraction of the maximum power at the "center" of the beam. Decibels are often used to express this ratio. Thus, for example, a beam might be defined as the conic or teardrop section over which the power is within 3 dB of the maximum power.

A phased-array antenna cannot direct its beam in an arbitrary direction—it becomes less efficient as the beam angle diverges from the principal direction (i.e., perpendicular to the line or plane of the array). For antennas with a reasonable number of emitters, the useful steering range may be about ±30° from the main direction. Thus, to achieve directional control over a full 360° (in one plane), a transceiver might need six antenna arrays (and many more for beam control over a hemispherical or full spherical range).

Antenna arrangements that can provide anisotropic control of transmission energy and reception sensitivity over a wider range than a prior-art phased array may be of significant value in this field.

SUMMARY

Embodiments of the invention combine multiple phased antenna arrays with RF energy deflectors to achieve greater directional coverage for data communications conducted over the transmitted and received radio signals.

DETAILED DESCRIPTION

Embodiments of the invention may be applied in a variety of different radio-frequency ("RF") communication systems, but they are especially beneficial in wireless local area network ("WLAN") systems, when used as a wireless access point for communicating with a plurality of peer nodes such as personal computers, tablet computers, cellular telephones (in WiFi mode), and similar devices. Embodiments support communications according to industry standards such as Institute of Electrical and Electronics Engineers ("IEEE") 802.11, a standard having a number of variants with transmission frequencies between 900 MHz (802.11ah) and 60 GHz (802.11ay). Most of the following discussion will focus on the widely-deployed 2.4 GHz, 5 GHz and 60 GHz variants, however there will be applications at any frequency including 70 and 80 GHz bands, with transmission power limits set by regulation at about 1 W (10 W for 60 GHz systems) in the United States.

Figure 1A:
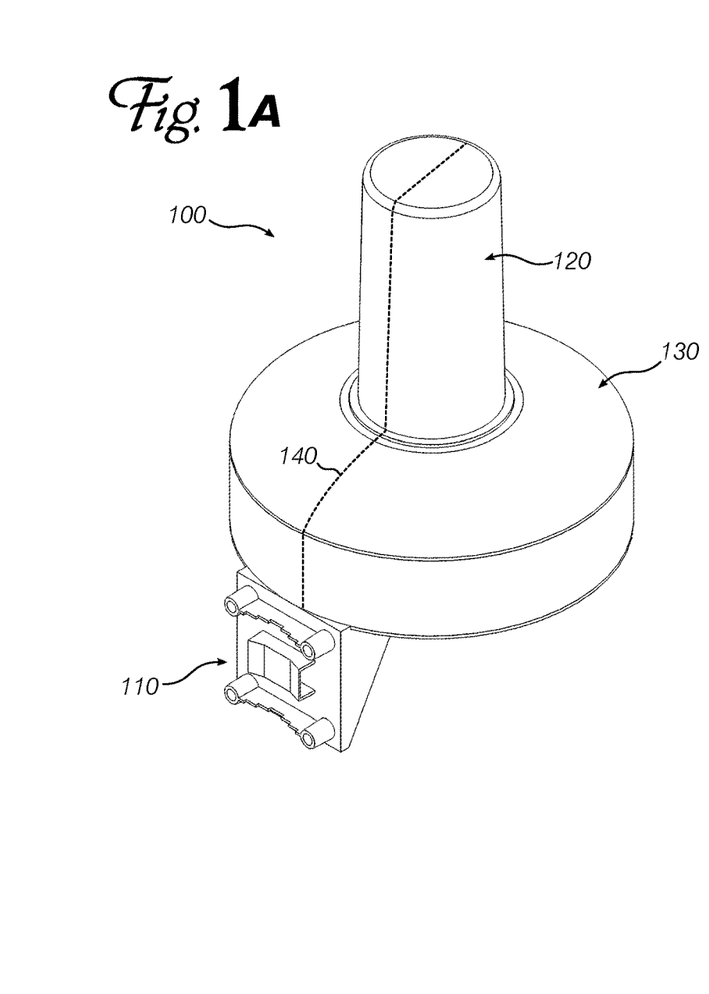
FIGS. 1A and 1B show a commercial wireless access point comprising an embodiment of the invention.
Figure 1B:
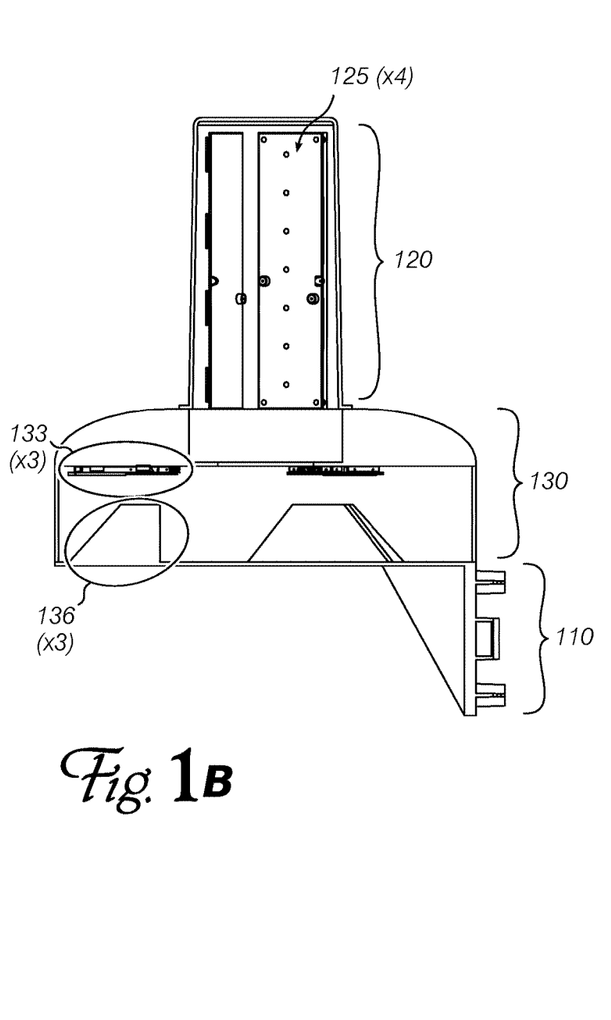

FIG. 1A shows a perspective view of the exterior of a multi-band wireless access point ("AP") 100 including an embodiment of the invention. The structure includes a mounting feature 110 and protective housings for 5 GHz and 60 GHz radio sections (120, 130). Dashed line 140 indicates the section line used for cutaway view FIG. 1B. In that figure, one of four 5 GHz antenna modules 125 is visible within the upper housing 120, and one of three 60 GHz phased-array antennas 133 is visible, adjacent a corresponding deflector 136. Embodiments comprise at least one phased-array antenna and at least one deflector, arranged to operate as described below.

Figure 4:
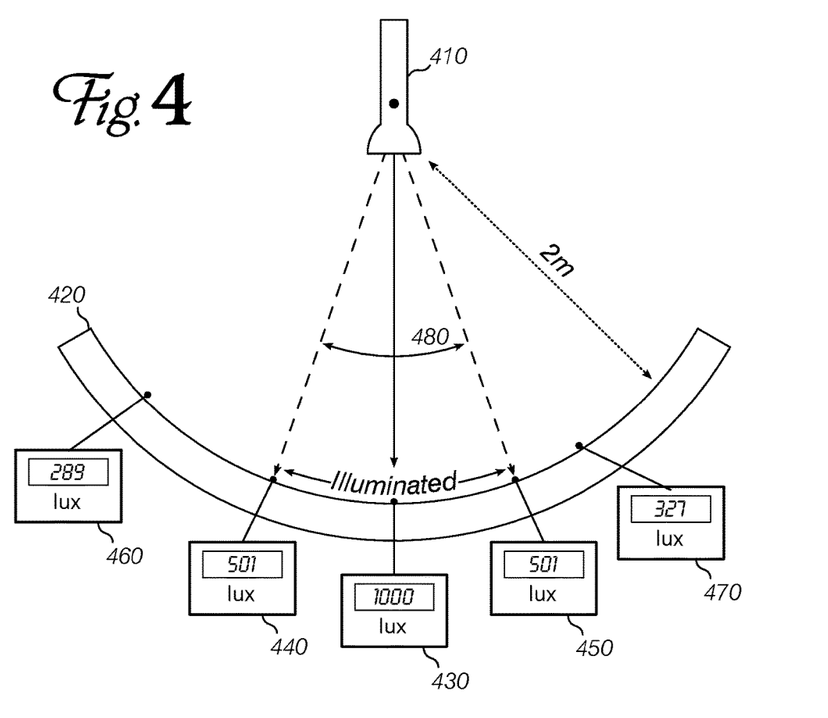
FIG. 4 depicts an analogous system to illustrate definitions used in the present specification.

For purposes of discussing the "edge" or "boundary" of a radio emission pattern, Applicants will use the points at which the radiated power is 3 dB below the maximum power at a constant radius from the emitter/antenna. In other words, and by analogy to optical (light) illumination as shown in FIG. 4, suppose a flash light 410 is directed at a point on curved wall 420, 2 m away. At the center of the illuminated area 430, the illuminance is 1000 lux. Moving left or right along the wall, the illuminance decreases. The illuminated boundary 440, 450 is where the illuminance falls 3 dB (to approximately half the maximum power), even though the wall beyond that point may still be dimly illuminated by the flashlight (460, 470). The "beam angle" 480 is the angle subtended by the flashlight and the left and right boundaries. For signal reception, the same shape/profile/boundary as for transmission will be assumed.

Figure 5:
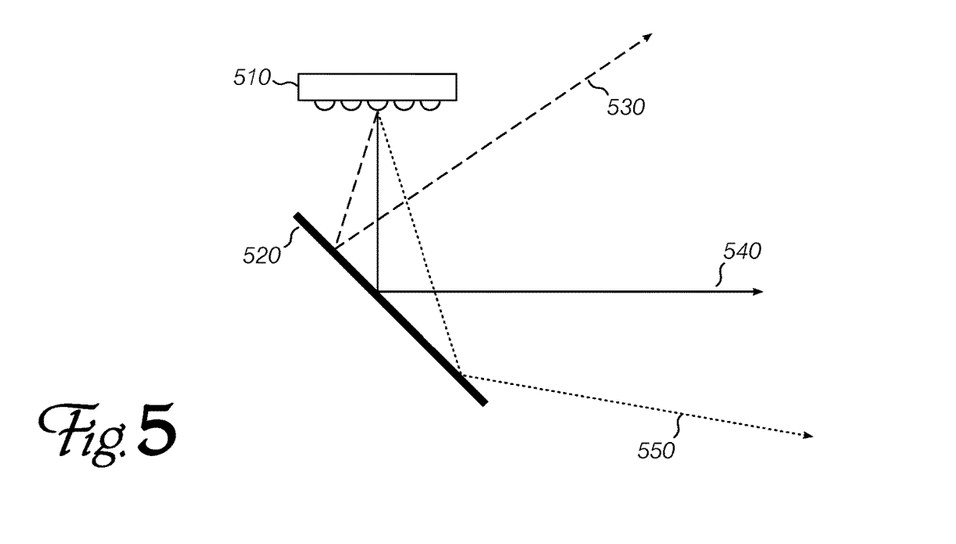
FIG. 5 shows a simple embodiment combining a phased-array antenna with a deflector.

FIG. 5 shows a side view of a single, phased-array antenna 510 directed at a planar reflective surface 520. The incident radio signal can be scanned from left to right over a control angle according to the capability of the phased-array antenna. This alters the angle of incidence onto the reflective surface, and consequently the angle of the reflected signal. The angle over which the reflected signal can scan is multiplied according to the angle between the central beam direction from the antenna and the reflective surface. For example, when the deflector is at a 45° angle as shown and the phased array can scan ±15°, the output (reflected) angle can cover ±45°.

Figure 6:
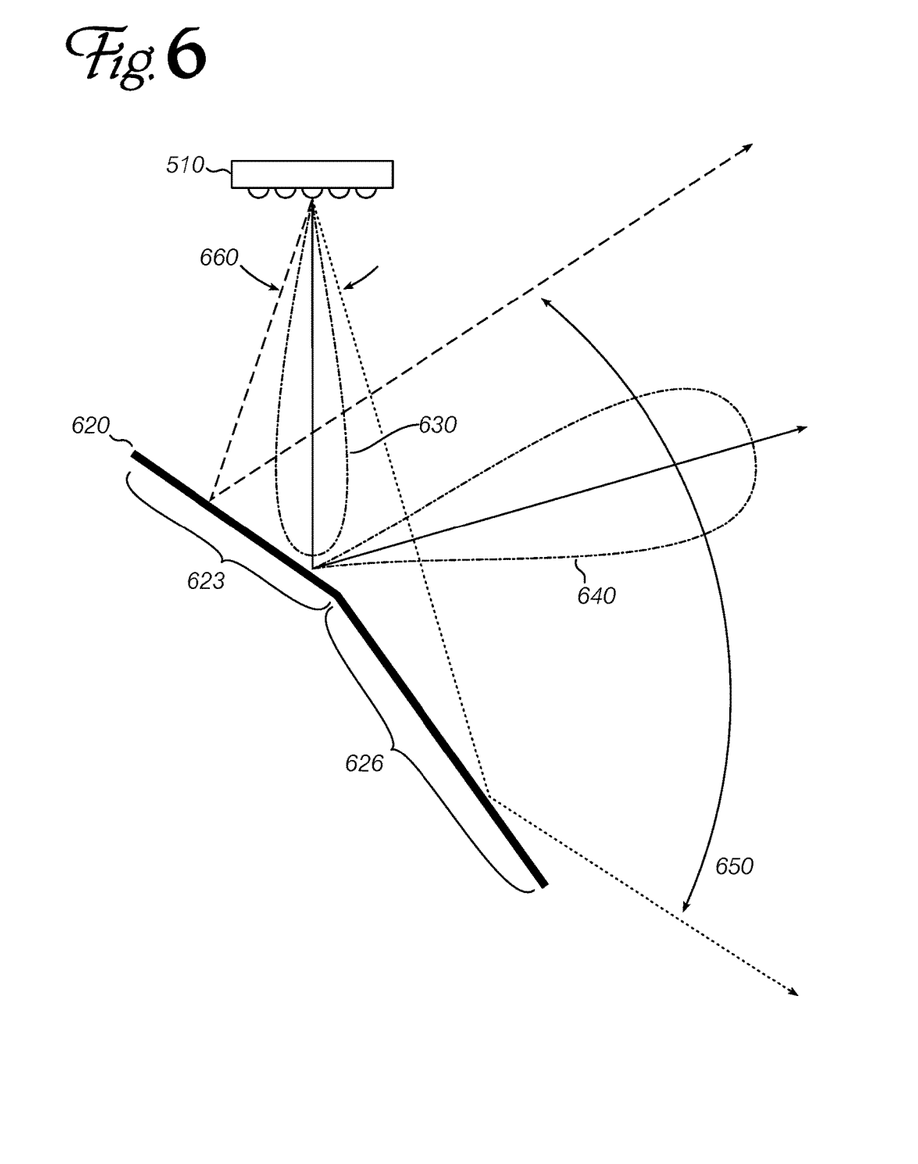
FIG. 6 shows a phased-array antenna with a multi-facet deflector.

FIG. 6 shows a side view of the same single, phased-array antenna 510 directed at a deflector 620 comprising two planes 623, 626 at an angle to one another. When the signal scans the first plane, it is reflected in a first direction; and when it scans the second plane, it is reflected in a second direction separated from the first direction by approximately the angle between the two reflective planes. If the radio signal was coherent and linear (like a laser beam), then there would be two separate areas that could be reached by the signal, possibly without any overlap. However, since the radio signal's 3 dB boundaries (630, 640) diverge to create a teardrop shape, a multi-plane deflector as depicted here permits the signal to reach a wider 650 area than would be possible based on the phased-array scanning angle 660 alone, or the phased-array scanning angle reflected off a single-plane surface as shown in FIG. 5. In other words, a multi-plane deflector increases or multiplies the phased-array's scanning angle, even more than a single-plane deflector does.

It is appreciated that a deflector having three or more planar segments may further increase the system's scanning angle. However, as the number of planes increases, the length of each segment (or area of each face, in a three-dimensional reflector) decreases (or the deflector must be enlarged and placed further away). A practical deflector for an embodiment of the invention has faces that are preferably on the order of the wavelength of the operating frequency. For example, a 2.5 GHz signal has a wavelength of about 12 cm (5 GHz is about 6 cm). deflectors for these frequencies should have faces that are about 10 cm in length (150 cm$^2$ in area). Smaller faces will still function as described, but will reflect a smaller portion of the incident radiation in the intended direction, thus reducing the power output or reception sensitivity.

In addition to reflective segment length (reflective face area), another tunable parameter is the angle between reflective planes or faces. To obtain good signal coverage over a wider area than the phased-array antenna alone can reach, adjacent faces of the reflector are preferably oriented at an angle approximately equal to one half of the beam scanning range. For example, with beam that can be scanned over a ±15° angle, adjacent planes or faces of the reflector should be at about 15° degrees from each other.

Figure 7:
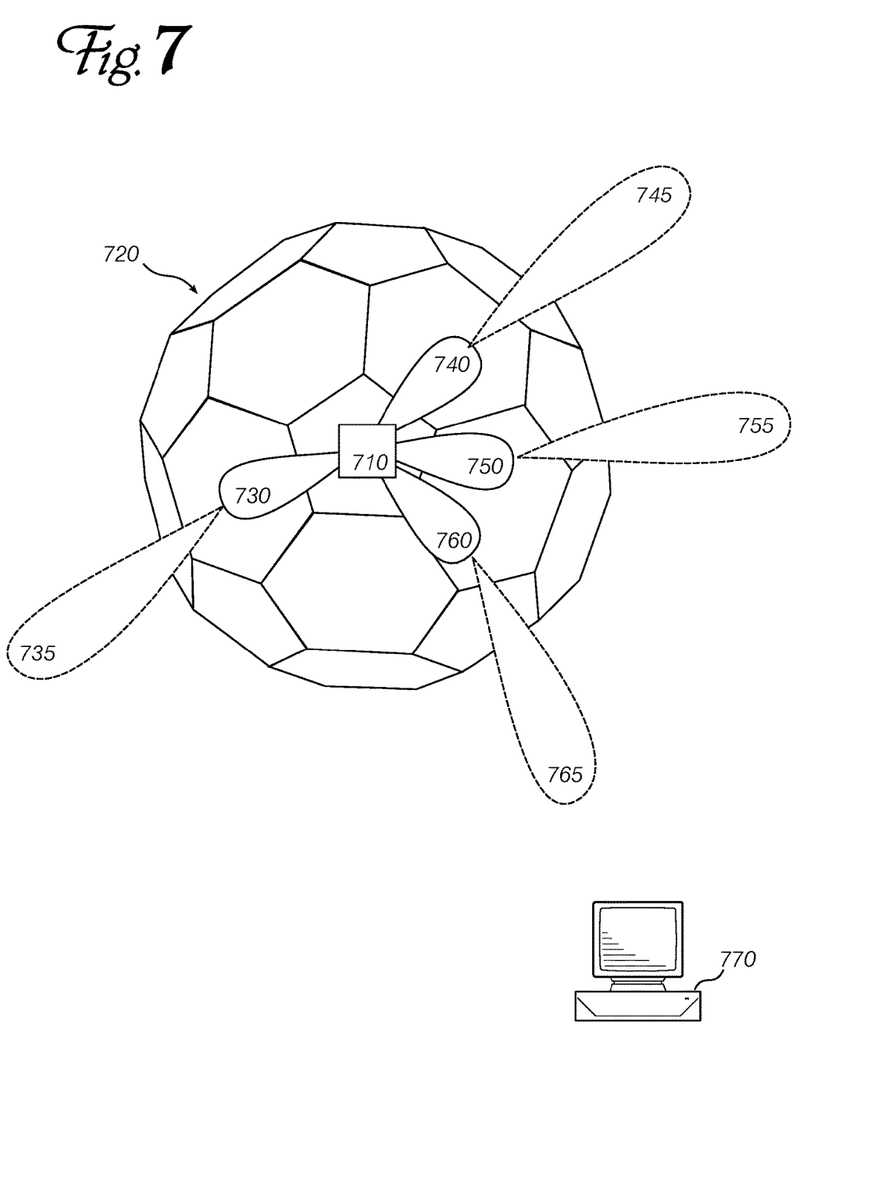
FIG. 7 shows a phased-array antenna with a three-dimensional hemispherical deflector.

In one embodiment, the deflector may be a three-dimensional hemisphere, with regular tiled planar faces arranged similarly to a soccer (European football) ball, as shown in FIG. 7. There, a two-dimensional phased-array antenna 710 can vary the direction of its radiated signal in x and y directions (as viewed from behind antenna 710) to illuminate various faces of deflector 720. These directed signals 730, 740, 750, 760 reflect from a face of the deflector 720 and diverge according to the incident angle as reflected signals 735, 745, 755 and 765, respectively. (Note that antenna 710 can only emit one of the directed signals at a time, but several independently-driven groups of phase-controlled antennas can be interleaved across the same physical array area, and each independently-driven group can transmit and/or receive from a different direction.) Operating software for a wireless access point can note the phase angle at which the best signal for a particular peer device 770 is obtained, and conduct subsequent communications with that device using the same angle.

An embodiment of the invention may arrange the phased-array antenna so that its output beam always hits the deflector somewhere, no matter how the phased-array is operated to scan the beam; or it may hit the deflector over a portion of its scanning range, and travel straight to the communication peer over another portion of the scanning range (without hitting the deflector).

An embodiment may include two or more phased-array antennas (each including three or more phase-controlled antennas), and all fixed adjacent to one or more radio-reflective objects. For example, if a phased-array antenna has a ±15° scanning angle, and is fixed near a deflector that extends the reachable range to ±60°, then three (3) such antennas with one or more deflectors can reach a full 360° circle (whereas twelve (12) phased-array antennas alone might be required to achieve the same coverage).

Figure 8:
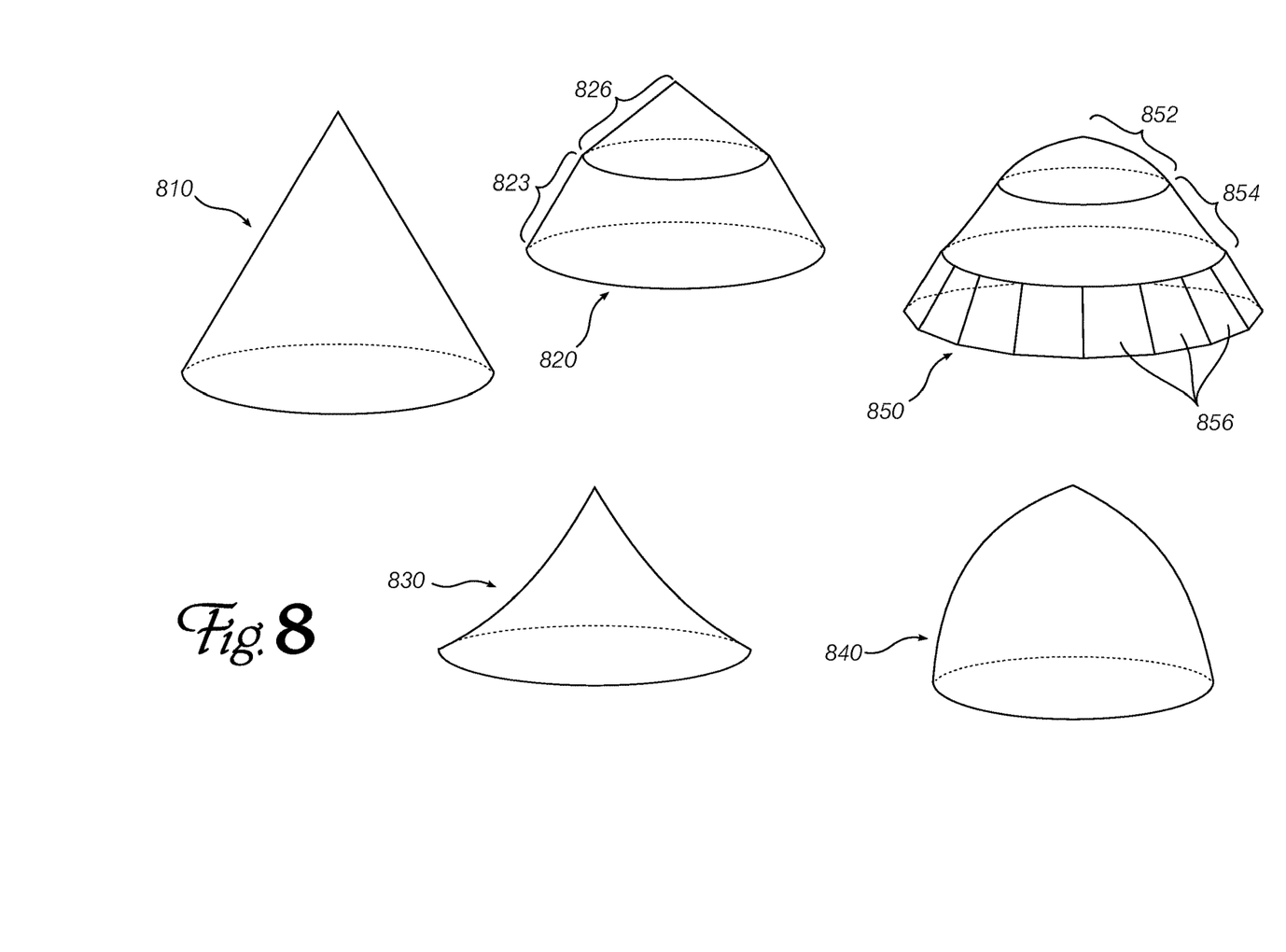
FIG. 8 shows several alternate deflector shapes that can be used with an embodiment of the invention.

The deflector(s) used in an embodiment, particularly in higher-frequency implementations, may have individual surfaces that are so small as to be effectively continuous or smooth. Several possible deflector shapes are shown in FIG. 8. For example, a conical deflector 810 may be used in some situations, while a parabolic 830 or other smooth solid shape 840 may be suitable in other situations. A conical deflector is a smooth, curved but linear shape (i.e., the sides of the cone are straight from apex to base). A parabolic deflector (for example) is smooth, curved and non-linear (i.e., the sides of the figure are curved from top to bottom, as well as curved by rotation around a central axis). A variety of deflector profiles may be used (not just straight-sided cones, hemispheres or parabola-sided figures). Combinations of features may provide useful beam deflection. For example, 850 shows a generally conical deflector having convex 852 and concave portions 854, adjoining at a discontinuity between two different conical angles; and a plurality of planar faces or facets 856 adjoining at the base.

In some embodiments, the deflector can be replaced with an angled, faceted and/or curved refractor—instead of reflecting the incident radiation back to the same side of the reflective surface, a refractor allows the radiation to pass through, but alters the direction of propagation like a prism alters the direction of a light ray. A refractor-based embodiment is very similar to a reflective one, and the basic principles are the same: the refractor allows an incident signal that can be adjusted over a narrow range, to be redirected to cover a wider range. This allows a smaller number of phased-array antennas to perform efficient point-to-point communications with peers dispersed across a wider area.

Figure 9:
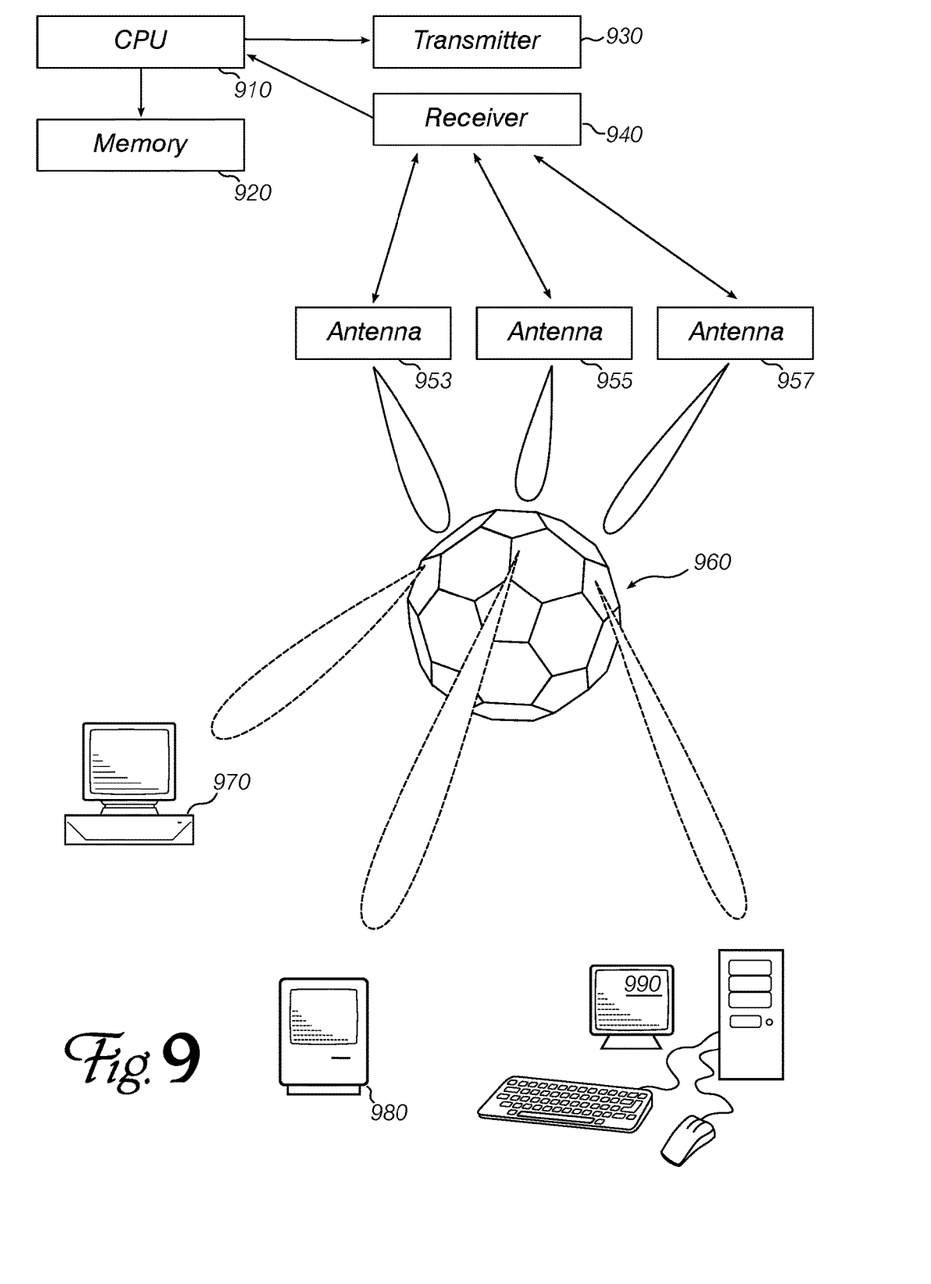
FIG. 9 is a block diagram of a wireless local area network access point according to an embodiment of the invention.

FIG. 9 is a system block diagram of a wireless local area network ("WLAN") access point ("AP") according to an embodiment of the invention. A programmable processor ("CPU") 910 is coupled to a memory 920, which contains instructions and data to cause the programmable processor to transmit and receive data via a radio transmitter 930 and receiver 940 and a plurality of phased-array antennas 953, 955, 857. (Each antenna comprises a plurality of individual, phase-controlled antennas that are operated together to permit directional control of a signal from the phased array.) The antennas are positioned so that the signals they emit (and receive) are reflected by one or more deflectors 960. The instructions and data cause the CPU to establish, maintain, and eventually terminate radio-frequency connections with one or more peer devices 970, 980, 990. While connections are ongoing, the peers may transmit data that is forwarded by the AP to other peers, or to other devices across a distributed data network such as the Internet. Software in the AP controls the phased-array antennas so that they emit signals in the best direction for communicating with peer devices, which may be distributed over the area that can be reached by radio signals at the available power level.

An embodiment of the invention may be a machine-readable medium, including without limitation a non-transient machine-readable medium, having stored thereon data and instructions to cause a programmable processor to perform operations as described above. In other embodiments, the operations might be performed by specific hardware components that contain hardwired logic. Those operations might alternatively be performed by any combination of programmed computer components and custom hardware components.

Instructions for a programmable processor may be stored in a form that is directly executable by the processor ("object" or "executable" form), or the instructions may be stored in a human-readable text form called "source code" that can be automatically processed by a development tool commonly known as a "compiler" to produce executable code. Instructions may also be specified as a difference or "delta" from a predetermined version of a basic source code. The delta (also called a "patch") can be used to prepare instructions to implement an embodiment of the invention, starting with a commonly-available source code package that does not contain an embodiment.

In some embodiments, the instructions for a programmable processor may be treated as data and used to modulate a carrier signal, which can subsequently be sent to a remote receiver, where the signal is demodulated to recover the instructions, and the instructions are executed to implement the methods of an embodiment at the remote receiver. In the vernacular, such modulation and transmission are known as "serving" the instructions, while receiving and demodulating are often called "downloading." In other words, one embodiment "serves" (i.e., encodes and sends) the instructions of an embodiment to a client, often over a distributed data network like the Internet. The instructions thus transmitted can be saved on a hard disk or other data storage device at the receiver to create another embodiment of the invention, meeting the description of a non-transient machine-readable medium storing data and instructions to perform some of the operations discussed above. Compiling (if necessary) and executing such an embodiment at the receiver may result in the receiver performing operations according to a third embodiment.

In the preceding description, numerous details were set forth. It will be apparent, however, to one skilled in the art, that the present invention may be practiced without some of these specific details. In some instances, well-known structures and devices are shown in block diagram form, rather than in detail, in order to avoid obscuring the present invention.

Some portions of the detailed descriptions may have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, including without limitation any type of disk including floppy disks, optical disks, compact disc read-only memory ("CD-ROM"), and magnetic-optical disks, read-only memories (ROMs), random access memories (RAMs), eraseable, programmable read-only memories ("EPROMs"), electrically-eraseable read-only memories ("EEPROMs"), magnetic or optical cards, or any type of media suitable for storing computer instructions.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will be recited in the claims below. In addition, the present invention is not described with reference to any particular programming language. It will be appreciated that a variety of programming languages may be used to implement the teachings of the invention as described herein.

The applications of the present invention have been described largely by reference to specific examples and in terms of particular allocations of functionality to certain hardware and/or software components. However, those of skill in the art will recognize that wider directional control of phased-array radio transmissions and receptions can also be produced by software and hardware that distribute the functions of embodiments of this invention differently than herein described. Such variations and implementations are understood to be captured according to the following claims.

We claim:

1. A directional radio-frequency transceiver antenna comprising:
   an array of phase-controlled antennas to produce an anisotropic radio-frequency ("RF") radiation pattern having a principal axis that is reorientable across a scanning range; and
   a radio-reflective element positioned near to the array of phase-controlled antennas so that the radiation pattern illuminates the radio-reflective element over at least a portion of the scanning range,
   said radio-reflective element shaped as a regularly-tiled hemisphere.

2. The directional radio-frequency transceiver antenna of claim 1, wherein the radiation pattern illumination boundary is the −3 dB contour.

3. The directional radio-frequency transceiver antenna of claim 1, wherein the radiation pattern illuminates at least a portion of the radio-reflective element over all of the scanning range.

4. The directional radio-frequency transceiver antenna of claim 1, wherein the radiation pattern does not illuminate the radio-reflective element over some of the scanning range.

5. The directional radio-frequency transceiver antenna of claim 1, wherein the array of phase-controlled antennas comprises at least three (3) phase-controlled antennas.

6. The directional radio-frequency transceiver antenna of claim 5, wherein the at least three (3) phase-controlled antennas are arranged in a line.

7. The directional radio-frequency transceiver antenna of claim 5, wherein the at least three (3) phase-controlled antennas are arranged in a rectangular array of m rows an n columns, m and n both exceeding one (1).

8. The directional radio-frequency transceiver antenna of claim 1, wherein the array of phase-controlled antennas is a first array of phase-controlled antennas, the directional radio-frequency transceiver antenna further comprising:
   a second array of phase-controlled antennas similar to the first array, said second array positioned near the radio-reflective element so that a radiation pattern of the second array also illuminates the radio-reflective element over a portion of a second scanning range of the second array.

9. The directional radio-frequency transceiver antenna of claim 8, further comprising a third array of phase-controlled antennas similar to the first array and the second array, said third array positioned near the radio-reflective element so that a radiation pattern of the third array illuminates the radio-reflective element over a portion of a third scanning range of the third array.

10. A wireless local area network ("WLAN") access point, comprising:
    a programmable processor coupled to a memory containing instructions and data to cause the programmable processor to establish, maintain and terminate radio communication sessions with a plurality of peer devices;
    a plurality of phase-controlled antennas organized into at least two groups, each group having at least three phase-controlled antennas, and each of said groups driven with a corresponding phase-shifted radio-frequency signal, said phase-shifted radio-frequency signals configured to cause the phase-controlled antennas of the corresponding group to radiate an anisotropic radio signal in a predetermined direction;
    a deflector fixed near the plurality of phase-controlled antennas so that the radiated anisotropic radio signals illuminate and reflect from the deflector and propagate towards a peer transceiver; and
    a radio receiver to receive a signal from the peer transceiver, wherein
    said signal from the peer transceiver illuminates the deflector and then reflects onto the at least three phase-controlled antennas of one of the at least two groups, and wherein
    the deflector comprises a plurality of reflective planar faces arranged as a regular tiling of a hemisphere.

11. The WLAN access point of claim 10 wherein an area of a reflective planar face is at least as large as a square of a wavelength of an operational frequency of the phase-controlled antennas.

12. The WLAN access point of claim 10 wherein the deflector further comprises a smooth linear curved surface.

13. The WLAN access point of claim 10 wherein the deflector further comprises a smooth nonlinear curved surface.

14. The WLAN access point of claim 10 wherein the deflector further comprises a smooth curved surface and a plurality of reflective planar faces.

\* \* \* \* \*